US006777477B1

(12) United States Patent
Niume et al.

(10) Patent No.: US 6,777,477 B1
(45) Date of Patent: Aug. 17, 2004

(54) COATING SOLUTION FOR FORMING TRANSPARENT AND CONDUCTIVE TIN OXIDE FILM AND METHOD FOR PREPARING TRANSPARENT AND CONDUCTIVE TIN OXIDE FILM, AND TRANSPARENT AND CONDUCTIVE TIN OXIDE FILM

(75) Inventors: Kazuma Niume, Chiba (JP); Takashi Uchida, Chiba (JP); Masateru Kimura, Chiba (JP)

(73) Assignee: Toyo Gosei Kogyo Co., Ltd., Chiba (JP)

( * ) Notice: Subject to any disclaimer, the term of this patent is extended or adjusted under 35 U.S.C. 154(b) by 0 days.

(21) Appl. No.: 09/889,395

(22) PCT Filed: Nov. 11, 2000

(86) PCT No.: PCT/JP00/08095

§ 371 (c)(1),
(2), (4) Date: Jul. 17, 2001

(87) PCT Pub. No.: WO01/36544

PCT Pub. Date: May 25, 2001

(30) Foreign Application Priority Data

Nov. 17, 1999 (JP) .............................. 11-326634
Nov. 10, 2000 (JP) ...................................... 2000-344339

(51) Int. Cl.$^7$ .............................. C08J 3/00; C08K 5/04; C08K 3/18; C08L 39/00; H01B 1/12
(52) U.S. Cl. ............... 524/430; 252/518.1; 252/519.32; 252/519.33; 252/519.34; 252/520.1; 524/399; 524/434; 524/555; 524/557; 524/910
(58) Field of Search .................... 524/399, 430, 524/434, 555, 557, 910; 252/518, 518.1, 519.32, 519.33, 519.34, 520.1

(56) References Cited

U.S. PATENT DOCUMENTS

| | | | | |
|---|---|---|---|---|
| 4,113,507 A | * | 9/1978 | McHenry et al. | 106/287.18 |
| 4,389,451 A | * | 6/1983 | Fujioka et al. | 428/212 |
| 4,431,764 A | * | 2/1984 | Yoshizumi | 524/409 |
| 5,204,177 A | * | 4/1993 | Sato et al. | 428/328 |
| 5,705,265 A | * | 1/1998 | Clough et al. | 428/307.3 |
| 5,855,820 A | | 1/1999 | Chan et al. | |
| 6,066,442 A | * | 5/2000 | Kurachi et al. | 430/530 |

FOREIGN PATENT DOCUMENTS

| | | | |
|---|---|---|---|
| JP | 62278705 | | 12/1987 |
| JP | 1257129 | | 10/1989 |
| JP | 02-261886 | * | 10/1990 |
| JP | 5436478 | | 7/1993 |
| JP | 6345430 | | 12/1994 |
| JP | 7242842 | | 9/1995 |

OTHER PUBLICATIONS

Kanbara, Takaki, Nagasaka, Masayuki, and Yamamoto, Takakazu; "Preparation of Electrically Conducting Indium–Tin Oxide Thin Films by Heat Treatment of Mixed–Metal Hydroxide Dispersion Containing Polymer Binder", Chem. Mater., vol. 2(6), 1990 pp. 643–645.*

* cited by examiner

Primary Examiner—Patrick D. Niland
(74) Attorney, Agent, or Firm—Huntley & Associates, LLC

(57) ABSTRACT

The invention relates to a coating solution for forming transparent conductive tin oxide film, a method for producing transparent conductive tin oxide film, and transparent conductive tin oxide film. The coating solution is capable of forming, from an inexpensive starting material such as tin oxide or tin chloride, strong tin oxide film endowed with excellent conductivity and transparency. The coating solution, which is intended to be used for forming, by way of coating, transparent conductive film predominantly containing tin oxide, contains stannic acid as its major component, and a water-soluble polymer having a polar group which is dissolved in the presence of at least one compound selected from the group consisting of ammonia and water-soluble amines.

24 Claims, No Drawings

COATING SOLUTION FOR FORMING TRANSPARENT AND CONDUCTIVE TIN OXIDE FILM AND METHOD FOR PREPARING TRANSPARENT AND CONDUCTIVE TIN OXIDE FILM, AND TRANSPARENT AND CONDUCTIVE TIN OXIDE FILM

TECHNICAL FIELD

The present invention relates to a coating solution for forming, on a substrate such as a glass or ceramic substrate or on an object, transparent conductive tin oxide film predominantly containing tin oxide, as well as to a method for producing the solution. The present invention is useful for producing components of electromagnetic shields, infrared-ray-reflectors, solar cells, liquid crystal displays (LCDs), plasma display panels (PDPs), electrodes of electroluminescent devices, and freezer showcases, or for producing anti-fogging electric heater glass panels employed in aircraft carriers. Particularly, the present invention is suited for a variety of applications such as transparent electrodes used in display devices; e.g., LCDs and PDPs; prevention of charging phosphor activated by a low-speed electron beam; conversion of fluorescent tubes to those of a rapid-start type (inner surface coating); surface electrodes of imaging tubes; surface electrodes of fluorescent tubes; homogenization of electric charge on the surface of phosphors used in a PDP; and prevention of charging synthetic fiber. In addition, the invention is useful for hard film material and applications suitable for high-refractive and high-reflective properties.

BACKGROUND ART

Conventionally, electrode materials having high transparency to visible light have been used in electrodes of display devices such as liquid crystal display devices, plasma display panels, and electroluminescent devices and have served as resistance heaters for preventing fogging and freezing of window panes of, for example, automobiles, aircraft, and buildings. Among such transparent conductive materials, compounds such as antimony-containing tin oxide (ATO) and tin-containing indium oxide (ITO) are known to serve as transparent conductive material, and, inter alia, ITO is widely used, in view of properties such as low specific resistance. However, since tin oxide exhibits superior stability under high-temperature and high-voltage conditions as compared with ITO, extensive studies have been performed on the formation of transparent conductive tin oxide film exhibiting properties which are comparable to those of ITO.

Several methods for forming tin oxide film; i.e., (1) sputtering, (2) spraying, and (3) CVD, have been known. When any of the methods (1) to (3) is employed, formation of tin oxide thin film on a large-area substrate is difficult. When a uniform, thin film is to be formed on such a substrate, a coating method is suitably employed. The coating method is advantageous in that thin film can be formed by use of a comparatively simple apparatus as compared with a complex and expensive apparatus for carrying out sputtering or a similar coating method. Thus, extensive studies have been carried out on the above application method.

One known coating method is a method involving application of an organic tin compound serving as raw material, to thereby form thin film. However, disadvantageously, carbon remains in the formed thin film, since the coating solution predominantly comprises organic compounds.

Among coating methods, another known coating method is a sol-gel method involving hydrolysis and polycondensation of a metal alkoxide. This method attains comparatively easy control of the composition of the film to be formed, and therefore, has been extensively investigated in connection with formation of thin film having excellent uniformity in film properties. However, the metal alkoxide is generally expensive, and carbon disadvantageously remains in the produced thin film.

Although coating methods are suitable for forming uniform thin film also-on a large-area substrate, as mentioned above, when the film is formed through a conventional coating method, there arise problems in the generation of pinholes and of microcracks due to carbon remaining in the produced thin film.

From another point of view, stannic acid is known to dissolve in an ammonia solution (Ullmann's Encyclopedia of Industrial Chemistry, Encyclopaedia Chimica, etc.). In this connection, Japanese Patent Publication (kokoku) No. 5-43647 discloses a method of producing conductive film by applying an ammonium stannate solution to a substrate.

However, the conductive film as disclosed in the aforementioned patent publication exhibits a surface resistivity of $5 \times 10^5$ ($\Omega/\square$), which is 100 times or more that of tin oxide film formed through a previously known coating method. Thus, such conductive film cannot be put into practice.

In view of the foregoing, an object of the present invention is to provide a coating solution for forming transparent conductive tin oxide film, which solution is prepared from an inexpensive tin compound such as tin chloride serving as a raw material and can provide tough tin oxide film endowed with excellent conductivity and transparency. Another object is to provide a method for producing transparent conductive tin oxide film. Still another object is to provide a transparent conductive tin oxide film.

DISCLOSURE OF THE INVENTION

In order to solve the aforementioned problems, in a first mode of the present invention, there is provided a coating solution for forming transparent conductive tin oxide film, which solution is intended to be used for forming, through a coating method, transparent conductive film predominantly containing tin oxide, characterized by comprising an aqueous solution containing stannic acid as its major component, and a water-soluble polymer having a polar group, which polymer is dissolved in the aqueous solution in the presence of at least one compound selected from the group consisting of ammonia and a water-soluble amine.

In a second mode of the present invention, there is provided a coating solution for forming transparent conductive tin oxide film according to the first mode, wherein the stannic acid is obtained by dissolving, in water, a hydroxide (stannic acid) obtained through hydrolysis of a tin compound selected from the group consisting of tin halides, organotin halides, stannate salts, and esters containing tin.

In a third mode of the present invention, there is provided a coating solution for forming transparent conductive tin oxide film according to the second mode, wherein the tin compound is a tin chloride.

In a fourth mode of the present invention, there is provided a coating solution for forming transparent conductive tin oxide film according to any one of the first to third modes, wherein the water-soluble polymer having a polar group is at least one species selected from the group consisting of poly(vinyl alcohol) (PVA), polyvinylacetamide (PNVA), polyvinylformamide (PNVF), polydimethylacrylamide (PDMAA), polyacrylamide (PAAM), polyacrylmorpholine (PAM), hydroxyethyl cellulose (HEC), hydroxypropyl cellulose (HPC), and carboxymethyl cellulose (CMC).

In a fifth mode of the present invention, there is provided a coating solution for forming transparent conductive tin oxide film according to any one of the first to fourth modes, wherein the water-soluble polymer having a polar group is contained in an amount of 0.1–5 wt. %.

In a sixth mode of the present invention, there is provided a coating solution for forming transparent conductive tin oxide film according to any one of the first to fifth modes, wherein the pH of the solution is 10 or more.

In a seventh mode of the present invention, there is provided a coating solution for forming transparent conductive tin oxide film according to any one of the first to sixth modes, wherein the water-soluble amine is at least one species selected from the group consisting of tetramethylammonium hydroxide, triethylamine, diethylamine, trimethylamine, and dimethylamine.

In an eighth mode of the present invention, there is provided a coating solution for forming transparent conductive tin oxide film according to any one of the first to seventh modes, wherein the solution contains, as a dopant, a water-soluble compound containing at least one of antimony, bismuth, and niobium.

In a ninth mode of the present invention, there is provided a coating solution for forming transparent conductive tin oxide film according to any one of the first to eighth modes, wherein the solution contains a water-soluble organic compound containing fluorine as a dopant.

In a tenth mode of the present invention, there is provided a transparent conductive tin oxide film, characterized by being formed by dissolving a water-soluble polymer having a polar group in an aqueous solution containing stannic acid as its major component and in the presence of at least one compound selected from the group consisting of ammonia and a water-soluble amine, to thereby form a transparent coating solution; applying the coating solution onto an object; and drying and heating the object to yield a tin oxide film.

In an eleventh mode of the present invention, there is provided a transparent conductive tin oxide film according to the tenth mode, wherein the water-soluble polymer having a polar group is at least one species selected from the group consisting of poly(vinyl alcohol) (PVA), polyvinylacetamide (PNVA), polyvinylformamide (PNVF), polydimethylacrylamide (PDMAA), polyacrylamide (PAAM), polyacrylmorpholine (PAM), hydroxyethyl cellulose (HEC), hydroxypropyl cellulose (HPC), and carboxymethyl cellulose (CMC).

In a twelfth mode of the present invention, there is provided a transparent conductive tin oxide film according to the tenth or eleventh mode, wherein the film contains, as a dopant, a water-soluble compound containing at least one of antimony, bismuth, and niobium.

In a thirteenth mode of the present invention, there is provided a transparent conductive tin oxide film according to any one of the tenth to twelfth modes, wherein the film contains a water-soluble organic compound containing fluorine as a dopant.

In a fourteenth mode of the present invention, there is provided a transparent conductive tin oxide film according to any one of the tenth to thirteenth modes, wherein the film has a specific resistance of less than $1 \times 10^{-2}$ $\Omega \cdot cm$.

In a fifteenth mode of the present invention, there is provided a method for producing transparent conductive tin oxide film, characterized by comprising dissolving a water-soluble polymer having a polar group in an aqueous solution containing stannic acid as its major component and in the presence of at least one compound selected from the group consisting of ammonia and a water-soluble amine, to thereby form a transparent coating solution; applying the coating solution on an object, to thereby form a coating film; and drying and heating the coating film, to thereby form transparent conductive tin oxide film.

In a sixteenth mode of the present invention, there is provided a method for producing transparent conductive tin oxide film according to the fifteenth mode, wherein the transparent coating solution comprises a hydroxide (stannic acid) dissolved in the solution, which hydroxide has been obtained through hydrolysis of a tin compound selected from the group consisting of tin halides, organotin halides, stannate salts, and esters containing tin.

In a seventeenth mode of the present invention, there is provided a method for producing transparent conductive tin oxide film according to the sixteenth mode, wherein the tin compound is a tin chloride.

In an eighteenth mode of the present invention, there is provided a method for producing transparent conductive tin oxide film according to any one of the fifteenth to seventeenth modes, wherein the water-soluble polymer having a polar group is at least one species selected from the group consisting of poly(vinyl alcohol) (PVA), polyvinylacetamide (PNVA), polyvinylformamide (PNVF), polydimethylacrylamide (PDMAA), polyacrylamide (PAAM), polyacrylmorpholine (PAM), hydroxyethyl cellulose (HEC), hydroxypropyl cellulose (HPC), and carboxymethyl cellulose (CMC).

In a nineteenth mode of the present invention, there is provided a method for producing transparent conductive tin oxide film according to any one of the fifteenth to eighteenth modes, wherein the water-soluble polymer having a polar group is contained in an amount of 0.1–5 wt. %.

In a twentieth mode of the present invention, there is provided a method for producing transparent conductive tin oxide film according to any one of the fifteenth to nineteenth modes, wherein the water-soluble amine is at least one species selected from the group consisting of tetramethylammonium hydroxide, triethylamine, diethylamine, trimethylamine, and dimethylamine.

In a twenty-first mode of the present invention, there is provided a method for producing transparent conductive tin oxide film according to any one of the fifteenth to twentieth modes, wherein the transparent coating solution contains, as a dopant, a water-soluble compound containing at least one of antimony, bismuth, and niobium.

In a twenty-second mode of the present invention, there is provided a method for producing transparent conductive tin oxide film according to any one of the fifteenth to twenty-first modes, wherein the transparent coating solution contains a water-soluble organic compound containing fluorine as a dopant.

In a twenty-third mode of the present invention, there is provided a method for producing transparent conductive tin oxide film according to any one of the fifteenth to twenty-second modes, wherein the coating film is dried at 90° C. to 100° C.

In a twenty-fourth mode of the present invention, there is provided a method for producing transparent conductive tin oxide film according to any one of the fifteenth to twenty-third modes, wherein the coating film is heated at 400° C. to 700° C.

The present inventors have carried out extensive studies in an effort to form a transparent coating solution which is an essential material for a coating method, and have found that a specific transparent aqueous solution containing stannic acid can be suitably employed as a coating solution in a coating method, the transparent aqueous solution being prepared by hydrolyzing a tin compound such as tin chloride, to form tin hydroxide (stannic acid) precipitates; dissolving the precipitates in water in the presence of at least one compound selected from the group consisting of ammonia and a water-soluble amine, to thereby form an aqueous solution; and dissolving in the aqueous solution a water-soluble polymer having a polar group. The present invention has been accomplished on the basis of this finding. Although formation of conductive film through the application of a stannic acid solution has previously been attempted (Japanese Patent Publication (kokoku) No. 5-43647), the formed conductive film exhibits a surface resistivity of as high as $5 \times 10^5$ ($\Omega/\square$), which is 100 times or more that of tin oxide film formed through a previously known coating method. In addition, when such a stannic acid solution is directly applied so as to form tin oxide film, the formed film has poor toughness.

Hitherto, conductive film attaining a practical level of conductivity and toughness has been neither produced nor put into practice. However, the present invention has now realized, on the basis of an addition of a water-soluble polymer having a polar group to a solution of stannic acid dissolved in an ammonia solution or an amine solution at a pH of 10 or higher, formation of transparent conductive tin oxide film endowed with a practical level of conductivity and toughness.

The present invention enables formation of high-quality but considerably inexpensive transparent conductive tin oxide film having good transparency and film properties. In addition, since in the present invention a customary coating method can be employed to attain easy production of the film, production costs can be reduced and the produced film can find a wide range of uses and applications.

Since the coating solution for forming transparent conductive tin oxide film according to the present invention contains stannic acid and a water-soluble polymer having a polar group, the formed transparent conductive film adheres to a substrate in a favorable state, due to the polar group, and is endowed with high density. In addition, the coating solution contains no organotin compound other than stannic acid and is applicable to a substrate or other objects in the form of transparent solution, to thereby form transparent conductive tin oxide film containing no defects such as pinholes, micro-cracks, or voids.

No particular dopant is required to be incorporated into the coating solution for forming transparent conductive tin oxide film according to the present invention, unless enhancement of conductivity is required. However, a hydroxide of a metal selected from at least one of antimony, bismuth, and niobium may be used. The combination of antimony and bismuth or the combination of antimony and niobium is preferred. Such a doped coating solution for forming transparent conductive tin oxide film can form transparent conductive tin oxide film endowed with good conductivity.

Furthermore, a dopant converting to an anion; e.g., fluorine, may also be used. Fluorine may be added to a coating solution in the form of water-soluble organic compound containing fluorine.

No particular limitation is imposed on the method for producing the coating solution for forming transparent conductive tin oxide film according to the present invention, so long as the solution is produced by dissolving stannic acid in the presence of at least one compound selected from the group consisting of ammonia and water-soluble amines. For example, a compound forming a hydroxide (stannic acid) through hydrolysis; e.g., a tin compound selected from the group consisting of tin halides, organotin halides, stannate salts, and esters containing tin, is hydrolyzed, to thereby form a hydroxide (stannic acid). The formed hydroxide (stannic acid) is optionally separated through filtration and dissolved by converting the medium to an alkaline medium.

A tin chloride may be used as the tin compound, with tin(IV) chloride being particularly preferred, since the tin chloride is hydrolyzed, to thereby readily produce precipitates of tin hydroxide.

In the present invention, the precipitates are separated through filtration in accordance with needs and are dissolved by adding at least one compound selected from the group consisting of ammonia and water-soluble amines so as to adjust the pH to 10 or higher, preferably 10.8 or higher, to thereby yield a coating solution in which stannic acid is dissolved. Although dissolution of tin hydroxide can be carried out at ambient temperature, dissolution may be carried out at elevated temperature in accordance with needs. In addition, formation of tin hydroxide through hydrolysis and dissolution of the hydroxide can be carried out in a sequential manner.

No particular limitation is imposed on the water-soluble amine, and any amines can be used, so long as the amines have a moderate basicity. Examples of such amines include tetramethylammonium hydroxide, triethylamine, diethylamine, trimethylamine, and dimethylamine.

However, even though the medium is converted to an alkaline medium, in uses involving formation of transparent conductive film, presence of metal ions adversely affects conductivity of formed transparent conductive film. Thus, use of sodium hydroxide or potassium hydroxide is not preferred.

Regarding ammonia and a water-soluble amine, ammonia; e.g., approximately 25% ammonia solution, is preferably used. When an ammonia odor is to be prevented, a compound such as tetramethylammonium hydroxide is preferably used.

Upon addition of a dopant for imparting conductivity to the coating solution for forming tin oxide according to the present invention, a compound which generates through hydrolysis a hydroxide; e.g. antimony halide, bismuth halide, or niobium halide, is added to a tin compound. These compounds are hydrolyzed with the tin compound, to thereby form a hydroxide. Alternatively, a metal hydroxide serving as a dopant is prepared in addition to tin hydroxide, and the prepared metal hydroxide may be dissolved together with tin hydroxide by an alkaline agent.

Examples of preferred tin compounds for producing the coating solution for forming transparent conductive tin oxide film according to the present invention include tin(IV) chloride. However, needless to say, the tin compounds are not particularly limited.

Examples of antimony compounds which are preferably employed as dopants include antimony trichloride and antimony pentachloride. In addition, other antimony compounds such as antimony sulfate can also be used. More preferably, in addition to antimony, another metal compound serving as a second dopant is used. The preferred second dopant is a bismuth compound, with bismuth chloride being more preferred.

The amount of the added dopant, which varies in accordance with the target conductivity, will be described. When a tin compound (A) and an antimony compound (B) are employed, a ratio of atomic Sn to atomic Sb (A:B) generally falls within 90–98:10–2, preferably 93–97:7–3. When the antimony is used in an amount less than the lower limit of the above range, sufficient conductivity cannot be attained, whereas when the amount is in excess of the upper limit of the range, disadvantageously, precipitation might occur in a solution used for forming transparent conductive tin oxide film, and visible light transmittance of the formed transparent conductive tin oxide film might decrease.

Fluorine can also be employed as a dopant. In this case, a water-soluble organic compound containing fluorine is added to the coating solution to be doped. Although the amount of fluorine is not particularly limited, the amount based on tin is preferably 1–7 mol %.

Examples of the water-soluble polymer having a polar group and to be used in the present invention include poly(vinyl alcohol) (PVA), polyvinylacetamide (PNVA), polyvinylformamide (PNVF), polydimethylacrylamide (PDMAA), polyacrylamide (PAAM), polyacrylmorpholine (PAM), hydroxyethyl cellulose (HEC), hydroxypropyl cellulose (HPC), and carboxymethyl cellulose (CMC).

A suitable water-soluble polymer having a polar group can be selected as appropriate from the above polymers. However, polymers which are as stable as possible at a pH of 10 or higher are preferably selected. In other words, water-soluble polymers which decompose or are denatured at a pH of 10 or higher are not preferably used, in view of stability of the coating solution.

For example, use of PVA (in the present invention, PVA also refers to saponified products of poly(vinyl acetate) and saponified products of modified poly(vinyl acetate)) occurs a problem. Specifically, when a typically used PVA of having a saponification degree of 86 is used, acetic acid released from the PVA neutralizes ammonia or a water-soluble amine, to thereby lower pH and precipitate stannic acid.

In such a case, if ammonia or a water-soluble amine is further added so as to maintain the pH at 10 or higher, no problem would occur. However, use of completely saponified PVA is preferred, because a coating solution containing completely saponified PVA exhibits high stability and can be stored for a long period of time.

Such a water-soluble polymer having a polar group is added generally in an amount of approximately 0.1–5 wt. %, depending on the type of polymer. The water-soluble polymer may be added to the coating solution until application of the coating solution is effected.

In the coating solution according to the present invention for forming transparent conductive tin oxide film, the water-soluble polymer having a polar group serves as a film-formation aid, to thereby form tin oxide film having a thickness of a practical level and having high toughness and conductivity. In addition, modifying the amount of the added water-soluble polymer can attain control of the film thickness in a desirable manner, which has been difficult to attain through previously known direct coating methods. Furthermore, conductive film having a thickness of 500 nm or more can be formed through a one-batch application step.

The coating solution according to the present invention for forming transparent conductive tin oxide film can be used for carrying out coating through a typical coating method such as dip coating and spin coating. Specifically, the solution is applied to a target portion, to thereby form a coating film of predetermined thickness, followed by drying and heating, to thereby readily produce transparent conductive tin oxide film.

No particular limitation is imposed on the object to which the coating solution, according to the present invention for forming transparent conductive tin oxide film, is applied. For example, when the coating solution is applied to a substrate for fabricating any of a variety of devices, the substrate is formed of transparent and heat-resistant material, preferably silica-coated glass plate, borosilicate glass plate, or quartz glass plate.

The transparent conductive tin oxide film, which contains tin oxide as a major component and is formed from the coating solution according to the present invention for forming transparent conductive tin oxide film, is endowed with high toughness and conductivity due to a water-soluble polymer having a polar group serving as a film-forming aid. The formed film having no pinholes and microcracks exhibits excellent transparency and adhesion to the object of coating.

BEST MODES FOR CARRYING OUT THE INVENTION

The present invention will next be described in more detail by way of examples, which should not be construed as limiting the invention thereto.

EXAMPLE 1

Tin(IV) chloride pentahydrate ($SnCl_4 \cdot 5H_2O$: 7.0 g) and antimony chloride ($SbCl_3$: 0.32 g) were weighed and placed in a 200-ml three-neck flask, and dissolved in water (35 g). Hydrochloric acid was added to the resultant mixture, to thereby adjust the pH to 0.5, and the mixture was stirred sufficiently, to thereby completely dissolve antimony chloride. Subsequently, ammonia solution was added to the resultant solution so as to adjust the pH to 8, to thereby yield precipitates. The precipitates were separated through filtration, washed, and collected.

Distilled water (in an amount of nine times the total amount of the precipitates) was added to the precipitates, to thereby yield a mixture, and 25% ammonia solution was added to the mixture so as to adjust the pH to 10.8. The mixture was allowed to stand for 24 hours at ambient temperature, to thereby yield a pale, yellowish brown clear solution.

PVA (0.41 g) was further added to the resultant solution, and the mixture was stirred sufficiently, to thereby yield a viscous solution. The solution was employed as a coating solution of Example 1.

EXAMPLE 2

The procedure described in Example 1 was repeated, except that bismuth trichloride (0.44 g) was used instead of antimony chloride, to thereby produce a coating solution.

EXAMPLE 3

The procedure described in Example 1 was repeated, except that PVA was not added, to thereby produce a coating solution.

EXAMPLE 4

The coating solution which had been obtained in Example 3 was maintained for 50 days at ambient temperature, to thereby yield a viscous solution having increased viscosity. The resultant solution was employed as a coating solution of Example 4.

EXAMPLE 5

Tin(IV) chloride pentahydrate (7.0 g) was weighed and placed in a 200-ml three-neck flask, and was dissolved in water (35 g). To the solution, 25% ammonia solution was added while stirring until the pH reached 8. The resultant precipitates were separated through filtration, washed, and collected. Distilled water (in an amount of nine times that of the precipitates) was added to the precipitates, and 25% ammonia solution was added to the resultant mixture so as to adjust the pH to 10.8. The thus-obtained mixture was allowed to stand for 24 hours at ambient temperature.

Trifluoroethanol (0.085 g) was added to the above solution (1.0 g), and the mixture was stirred sufficiently, followed by addition of PVA (0.03 g). The thus-obtained mixture was stirred, to thereby yield a coating solution of Example 5.

EXAMPLE 6

Pure water (30 g) was added to tin(IV) chloride pentahydrate (3.6 g) and antimony chloride (0.128 g), and hydrochloric acid was added to the mixture so as to adjust the pH to 0.2, to thereby completely dissolve the chlorides. To the resultant solution, 28% ammonia solution was gradually added so as to adjust the pH to 7, to thereby yield precipitates of stannic acid containing antimony. The mixture was centrifuged for separation of precipitates. The separated precipitates were redispersed in pure water, and the mixture was centrifuged again. The procedure from redispersion to centrifugation was repeated twice, and the thus-obtained precipitates were washed. Pure water (4.0 g with respect to 3.1 g of the precipitates) was added to the precipitates, and tetramethylammonium hydroxide (TMAH) was added to the mixture so as to adjust the pH to 10.8. The precipitates were immediately dissolved, to thereby yield a yellowish brown clear solution.

Polyvinylacetamide was added in an amount of 1% to the solution, to thereby yield a coating solution.

EXAMPLE 7

The procedure described in Example 1 was repeated, except that PVA (0.87 g) was added, to thereby yield a coating solution.

COMPARATIVE EXAMPLE 1

Tin(IV) chloride pentahydrate ($SnCl_4 \cdot 5H_2O$: 7.0 g) and antimony chloride ($SbCl_3$: 0.32 g) were weighed and placed in a 200 ml three-neck flask, and distilled water (32 g) was added thereto. Hydrochloric acid was added to the resultant mixture while stirring so as to adjust the pH to 0.5, to thereby completely dissolve antimony chloride. The resultant precipitates were separated through filtration. Distilled water (37 g) was added to the precipitates, followed by ultrasonic dispersion, to thereby yield a coating solution.

COMPARATIVE EXAMPLE 2

In a dry nitrogen atmosphere, triethanolamine (TEA: 0.2 g) was added to ethanol (16.8 g), and the mixture was stirred. To the mixture, tin butoxide ($Sn(O(n-C_4H_9))_4$) (2.29 g), antimony butoxide ($Sb(O(i-C_4H_9))_4$) (0.10 g), and TEA (0.3 g) were added. Subsequently, distilled water (0.6 ml) was gradually added dropwise to the mixture, followed by sufficient stirring, to thereby yield a coating solution.

COMPARATIVE EXAMPLE 3

The procedure described in Example 1 was repeated, except that polyethylene glycol 2000 (0.29 g) was used instead of PVA, to thereby yield a coating solution.

Test Example 1

Each of the coating solutions of Examples 1–5 and Comparative Examples 1–3 was applied to an $SiO_2$-coated soda glass substrate through dip-coating at a withdrawal speed of 5 cm/minute.

Subsequently, each of the substrates was dried at 100° C. for 30 minutes and heated at 600° C. for 1 hour, to thereby yield transparent tin oxide film.

Each of the coating solutions of Examples 6 and 7 was applied on a similar glass substrate through spin-coating at 500 rpm, and the thus-coated glass substrate was heated at 550° C. for 40 minutes.

The obtained transparent tin oxide film samples were subjected to measurements of specific resistance, transmittance, and film thickness. Moreover, film quality of each tin oxide film sample was evaluated through optical microscopic observation of the presence or absence of defects such as pinholes and microcracks. The following ratings were assigned: AA: No pinholes or microcracks were observed; BB: few pinholes or microcracks were observed; and CC: a number of pinholes or microcracks were observed. The results are shown in Table 1.

TABLE 1

|  | Specific Resistance ($\Omega \cdot cm$) | Transmittance (%) | Film Quality | Film Thickness (nm) |
| --- | --- | --- | --- | --- |
| Example 1 | $3.73 \times 10^{-3}$ | 93 | AA | 290 |
| Example 2 | $6.56 \times 10^{-3}$ | 92 | AA | 280 |
| Example 3 | $5.17 \times 10^{-1}$ | 90 | BB | 60 |
| Example 4 | $1.15 \times 10^{-2}$ | 93 | AA | 120 |
| Example 5 | $1.53 \times 10^{-2}$ | 90 | AA | 250 |
| Example 6 | $3.17 \times 10^{-3}$ | 92 | AA | 260 |
| Example 7 | $3.15 \times 10^{-3}$ | 92 | AA | 510 |
| Comp. Ex. 1 | $3.55 \times 10^{-2}$ | 89 | CC | 160 |
| Comp. Ex. 2 | $5.15 \times 10^{-2}$ | 87 | CC | 170 |
| Comp. Ex. 3 | $3.15 \times 10^{-1}$ | 91 | CC | 190 |

From the results, it is apparent that the present invention can provide a transparent conductive tin oxide film endowed with low specific resistance and high transmittance without any pinholes or microcracks. Conditions such as the method for applying a coating solution, the drying temperature of the coating solution, and the heating temperature of the coating solution are not limited to the above-described Examples. However, generally, a drying temperature within the range of 90° C. to 100° C., and a heating the range of 400° C. to 700° C. are preferred.

What is claimed is:

1. A coating solution for forming transparent conductive tin oxide film, which solution is intended to be used for forming, through a coating method, transparent conductive film predominantly containing tin oxide, characterized by comprising an aqueous solution containing stannic acid as its major component, and a water-soluble polymer having a polar group, which stannic acid is not dispersed but is dissolved in the aqueous solution in the presence of at least one compound selected from the group consisting of ammonia, water-soluble amine, and basic quaternary amine.

2. A coating solution for forming transparent conductive tin oxide film according to claim 1, wherein the aqueous solution is obtained by dissolving, in water, the stannic acid which is a hydroxide obtained through hydrolysis of a tin compound selected from the group consisting of tin halides, organotin halides, stannate salts, and esters containing tin.

3. A coating solution for forming transparent conductive tin oxide film according to claim 2, wherein the tin compound is a tin chloride.

4. A coating solution for forming transparent conductive tin oxide film according to claim 1, wherein the water-soluble polymer having a polar group is at least one species selected from the group consisting of poly(vinyl alcohol) (PVA), polyvinylacetamide (PNVA), polyvinylformamide (PNVF), polydimethylacrylamide (PDMAA), polyacrylamide (PAAM), polyacrylmorpholine (PAM), hydroxyethyl cellulose (HEC), hydroxypropyl cellulose (HPC), and carboxymethyl cellulose (CMC).

5. A coating solution for forming transparent conductive tin oxide film according to claim 1, wherein the water-soluble polymer having a polar group is contained in an amount of 0.1–5 wt. %.

6. A coating solution for forming transparent conductive tin oxide film according to claim 1, wherein the pH of the solution is 10 or more.

7. A coating solution for forming transparent conductive tin oxide film according to claim 1, wherein the water-soluble amine or basic quaternary amine is at least one species selected from the group consisting of tetramethylammonium hydroxide, triethylamine, diethylamine, trimethylamine, and dimethylamine.

8. A coating solution for forming transparent conductive tin oxide film according to claim 1, wherein the solution contains, as a dopant, a water-soluble compound containing at least one of antimony, bismuth, and niobium.

9. A coating solution for forming transparent conductive tin oxide film according to claim 1, wherein the solution contains a water-soluble organic compound containing fluorine as a dopant.

10. A transparent conductive tin oxide film, characterized by being formed by dissolving a water-soluble polymer having a polar group in an aqueous solution containing stannic acid as its major component, which stannic acid is dissolved in the presence of at least one compound selected from the group consisting of ammonia, water-soluble amine, and basic quaternary amine, to thereby form a transparent coating solution; applying the coating solution onto an object; and drying and heating the object to yield a tin oxide film.

11. A transparent conductive tin oxide film according to claim 10, wherein the water-soluble polymer having a polar group is at least one species selected from the group consisting of poly(vinyl alcohol) (PVA), polyvinylacetamide (PNVA), polyvinylformamide (PNVF), polydimethylacrylamide (PDMAA), polyacrylamide (PAAM), polyacrylmorpholine (PAM), hydroxyethyl cellulose (HEC), hydroxypropyl cellulose (HPC), and carboxymethyl cellulose (CMC).

12. A transparent conductive tin oxide film according to claim 10, wherein the film contains, as a dopant, a water-soluble compound containing at least one of antimony, bismuth, and niobium.

13. A transparent conductive tin oxide film according to claim 10, wherein the film contains a water-soluble organic compound containing fluorine as a dopant.

14. A transparent conductive tin oxide film according to claim 10, wherein the film has a specific resistance of less than $1 \times 10^{-2}$ Ω cm.

15. A method for producing transparent conductive tin oxide film, characterized by comprising dissolving a water-soluble polymer having a polar group in an aqueous solution containing stannic acid as its major component, which stannic acid is dissolved in the presence of at least one compound selected from the group consisting of ammonia, water-soluble amine, and basic quaternary amine, to thereby form a transparent coating solution; applying the coating solution to an object, to thereby form a coating film; and drying and heating the coating film, to thereby form transparent conductive tin oxide film.

16. A method for producing transparent conductive tin oxide film according to claim 15, wherein the transparent coating solution comprises the stannic acid dissolved in the solution, which stannic acid is a hydroxide which has been obtained through hydrolysis of a tin compound selected from the group consisting of tin halides, organotin halides, stannate salts, and esters containing tin.

17. A method for producing transparent conductive tin oxide film according to claim 16, wherein the tin compound is a tin chloride.

18. A method for producing transparent conductive tin oxide film according to claim 15, wherein the water-soluble polymer having a polar group is at least one species selected from the group consisting of poly(vinyl alcohol) (PVA), polyvinylacetamide (PNVA), polyvinylformamide (PNVF), polydimethylacrylamide (PDMAA), polyacrylamide (PAAM), polyacrylmorpholine (PAM), hydroxyethyl cellulose (HEC), hydroxypropyl cellulose (HPC), and carboxymethyl cellulose (CMC).

19. A method for producing transparent conductive tin oxide film according to claim 15, wherein the water-soluble polymer having a polar group is contained in an amount of 0.1–5 wt. %.

20. A method for producing transparent conductive tin oxide film according to claim 15, wherein the water-soluble amine or basic quaternary amine is at least one species selected from the group consisting of tetramethylammonium hydroxide, triethylamine, diethylamine, trimethylamine, and dimethylamine.

21. A method for producing transparent conductive tin oxide film according to claim 15, wherein the transparent coating solution contains, as a dopant, a water-soluble compound containing at least one of antimony, bismuth, and niobium.

22. A method for producing transparent conductive tin oxide film according to claim 15, wherein the transparent coating solution contains a water-soluble organic compound containing fluorine as a dopant.

23. A method for producing transparent conductive tin oxide film according to claim 15, wherein the coating film is dried at 90° C. to 100° C.

24. A method for producing transparent conductive tin oxide film according to claim 15, wherein the coating film is heated at 400° C. to 700° C.

* * * * *